United States Patent [19]
Beckwith et al.

[11] Patent Number: 5,197,653
[45] Date of Patent: Mar. 30, 1993

[54] METHOD OF SEALING TWO ARTICLES TOGETHER WITH AN INDIUM PREFORM SEAL

[75] Inventors: Timothy A. Beckwith, Coon Rapids; Theodore J. Podgorski, St. Paul, both of Minn.

[73] Assignee: Honeywell Inc., Minneapolis, Minn.

[21] Appl. No.: 859,192

[22] Filed: Mar. 27, 1992

[51] Int. Cl.⁵ .................. B23K 20/02; B23K 20/24
[52] U.S. Cl. ................................ 228/116; 228/124; 228/205
[58] Field of Search ............... 228/116, 40, 205, 245, 228/253, 254, 124, 207

[56] References Cited

U.S. PATENT DOCUMENTS

| | | | |
|---|---|---|---|
| 4,153,317 | 5/1979 | Ljung et al. | 316/19 |
| 4,233,568 | 11/1980 | Hamerdinger et al. | 372/107 |
| 4,273,282 | 6/1981 | Norvell et al. | 228/116 |
| 4,432,660 | 2/1984 | Norvell et al. | 403/29 |
| 4,612,647 | 9/1986 | Norvell | 372/88 |
| 4,817,112 | 3/1989 | Weber et al. | 372/94 |
| 4,930,676 | 6/1990 | NcNaught et al. | 228/115 |

OTHER PUBLICATIONS

*Toshiba Glass-Sealed He-Ne Laser Tubes;* by T. Shimada, T. Kaneko and S. Katagiri; *Toshiba Review,* #105, Sep.-Oct. 1976, pp. 40-43.

*Primary Examiner*—Richard K. Seidel
*Assistant Examiner*—Jeanne M. Elpel
*Attorney, Agent, or Firm*—Robert A. Pajak

[57] ABSTRACT

Two articles are provided with mounting surfaces which are to be joined together. A ring shaped preform is selected which consists substantially of indium. The preform is placed on a plate like support means having a plurality of flow through apertures such that the apertures are located to be in alignment with and under at least portions of the preform to permit the passage of cleaning agents through the apertures and around at least selected portions of the preform. A motion limiting means is coupled to the support means so as to serve to limit motion of the preform, bounded by the support means and the motion limiting means. With the motion limiting means in place, the combination of the motion limiting means and the support means can be handled without any contact with the preform.

3 Claims, 3 Drawing Sheets

METHOD OF SEALING TWO ARTICLES TOGETHER WITH AN INDIUM PREFORM SEAL

FIELD OF THE INVENTION

The present invention relates to sealing two articles together with an indium preform seal. More specifically, this invention relates to the method of sealing two articles together with an indium preform seal which permits cleaning of the preform and application to one of the articles without direct handling of the preform.

BACKGROUND OF THE INVENTION

Gas discharge devices are commonly provided by a gas discharge cavity in which a plurality of electrodes are attached thereto. An economic process for attaching the electrodes to the gas discharge cavity include, among others, the use of an indium material for sealing the electrode to the gas discharge cavity. The joint provided by indium has proven to be mechanically strong and usually, but not essentially, the joint provides a hermetic seal between any two articles. It is desirable that the indium seal be able to accommodate any differential in the thermal expansion between the two articles joined together.

In many laser devices, the gas discharge cavity is provided by a glass tube or block consisting of a glass, a ceramic, glass ceramic, or the like. On the other hand, the electrode generally consists of a metal such as aluminum, nickel-iron alloys, and the like. Therefore, the use of an indium seal in this application requires that the indium seal be somewhat malleable in its sealed condition in order to accommodate the different coefficients of expansion of two dissimilar materials. The use of indium in such an application is particularly described in U.S. Pat. No. 4,930,676, issued to McNaught et al, entitled "Joint Between Articles Of Materials Of Different Coefficients Of Thermal Expansion", and also in U.S. Pat. No. 4,273,282, issued to Norvell et al, entitled "Glass Or Ceramic-To-Metal Seals".

Laser applications of gas discharge devices require that the gas discharge cavity contain a lasing gas free from contaminants. Commonly, lasers utilize selected proportions of helium and neon gases. When components, such as electrodes and mirrors, are attached to the gas discharge cavity, the method of attachment must be such to minimize any contamination of the lasing gas during the life of the laser. Therefore, when using a joint material between the components and the gas discharge cavity, the joint material must minimally produce any outgassing into the gas discharge cavity, provide a hermetic seal, and be free from other contaminants which may be harmful to the mirrors which form, in part, a gas laser.

To satisfy the aforementioned requirements of attaching electrodes to gas discharge cavities for laser applications, an indium seal has been commonly selected, particularly as described in the aforementioned patents. Further, as is described in both of the above-referred to patents, the mounting surfaces of the articles to be attached, namely the gas discharge cavity and the electrode, are required to be "super clean." This is so since the indium seal adhesiveness to the cleaned parts is enhanced, and secondly so that the parts themselves do not contribute to any contamination of the lasing gas. A cleaning process for cleaning the articles to be sealed together is particularly described in both the McNaught et al patent and the Norvell et al patent.

One common practice in sealing an electrode to a laser block is to utilize preforms consisting of pre-cut lengths of indium wire. Great lengths are employed to clean these indium wire preforms prior to the sealing process. The McNaught et al patent considers the cleanliness of the indium wire preform to be so highly desired, that McNaught et al teaches and claims that an indium preform be produced "immediately" before providing the joint such that the indium preform wire is substantially free from impurities and minimally oxidized. In contrast, Norvell, et al, teaches cleaning the articles followed by applying an indium preform to one of the articles, followed by cleaning the combination of the article and preform before sealing the two articles together.

The Norvell et al patent is particularly applicable to joining an electrode made of aluminum or copper to a glass-ceramic material. In order to enhance the joint between these two dissimilar materials, the mounting surface of the electrode is first provided with a layer of gold followed by a layer of indium over the gold. The indium preform after being applied over the gold is heated to 175° C. to form a gold-indium alloy between the electrode mounting surface and the exterior surface which is substantially indium. During the heating process, outgassing of any contaminants of the articles or indium is allowed to occur. In turn, the electrode with the indium layer is cooled, and subsequently cleaned before being pressed against the mounting surface of the glass-ceramic to form the joint.

SUMMARY OF THE INVENTION

The present invention pertains to both a method and apparatus of a novel seal particularly useful in the manufacture of lasers and other kinds of gas discharge device which provides a high degree of cleanliness of the joint.

In the invention of the present application, two articles are provided with mounting surfaces which are to be joined together. A ring shaped preform is selected which consists substantially of indium. The preform is placed on a plate like support means having a plurality of flow through apertures such that the apertures are located to be in alignment with and under at least portions of the preform to permit the passage of cleaning agents through the apertures and around at least selected portions of the preform. A motion limiting means is coupled to the support means so as to serve to limit motion of the preform, bounded by the support means and the motion limiting means. With the motion limiting means in place, the combination of the motion limiting means and the support means can be handled without any contact with the preform. In turn, this combination can be processed through a variety of cleaning steps to permit cleaning agents to remove any contaminants which are part of the indium perform. In turn, the motion limiting means may be removed, and one of the articles may then have its mounting surface placed in contact with the preform so that the preform sticks to the article mounting surface. In turn, the article with the indium preform may then be pressed against a mounting surface of a second article with sufficient pressure to seal together the mounting surfaces of both of the articles.

BRIEF DESCRIPTION OF THE DRAWINGS

FIG. 6b is a cross-section view of FIG. 6a.

FIG. 6c is a plan view of a handle for the receptacle means of FIG. 6a

DETAILED DESCRIPTION OF THE INVENTION

Figure 1:
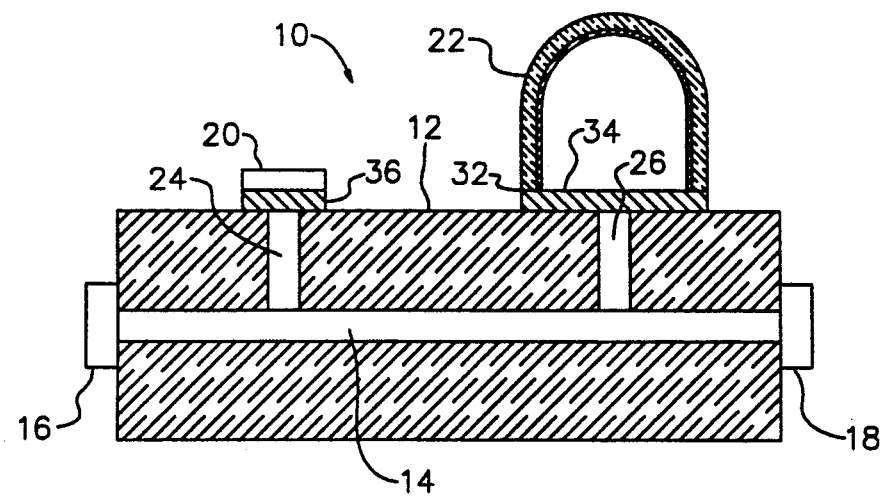
FIG. 1 is a cross-sectional view of a laser.

Referring now to FIG. 1, thereshown is a cross-sectional view of a laser 10 similar to that illustrated in U.S. Pat. No. 4,612,647, issued to Norvell, entitled "High Performance Laser and Method of Making Same." The last referred to patent describes a method for securing an electrode to a laser body or block using field-assist bonding. Laser 10 includes a laser block 12, which may be provided by a variety of glass, glass-ceramics, metals, or the like so as to provide a lasing cavity 14 within the laser block 12. Highly polished mirrors 16 and 18 are fixed to the laser block 12 at opposite ends of the lasing cavity 14 so as to provide an optical closed path to establish lasing operation in a well known manner. Two electrodes, anode 20 and cathode 22, communicate with the lasing cavity 14 through upright bores 24 and 26, respectively.

Cathode 22 is generally hemispherical, with a mounting surface 32. Cathode 22 may be constructed from a wide variety of materials including, among others, aluminum, Invar, beryllium, and even glass with an electrically conductive coating such as taught in U.S. Pat. No. 4,612,647. The details of cathode 22, as well anode 20, are beyond the scope of the present invention.

In FIG. 1, anode 20 is illustrated as a button-like electrode sealed to block 12 with an indium seal 36. Cathode 22 is illustrated fixed to laser block 12 by an indium seal 34.

Figure 2:
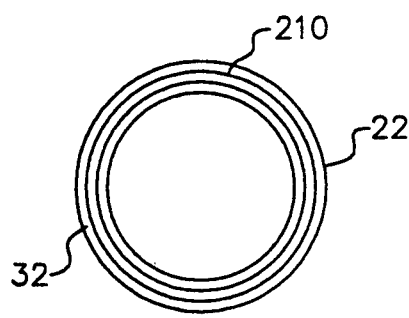
FIG. 2 is a plan view of an electrode with an indium preform attached thereto.

FIG. 2 illustrates a plan view of only cathode 22 with an indium preform seal 210 prior to making the seal with laser block 12, which becomes the indium seal 34 as illustrated in the complete assembly of FIG. 1. As illustrated, the indium preform has a washer-like shape, herein referred to as ring shaped.

Figure 3:
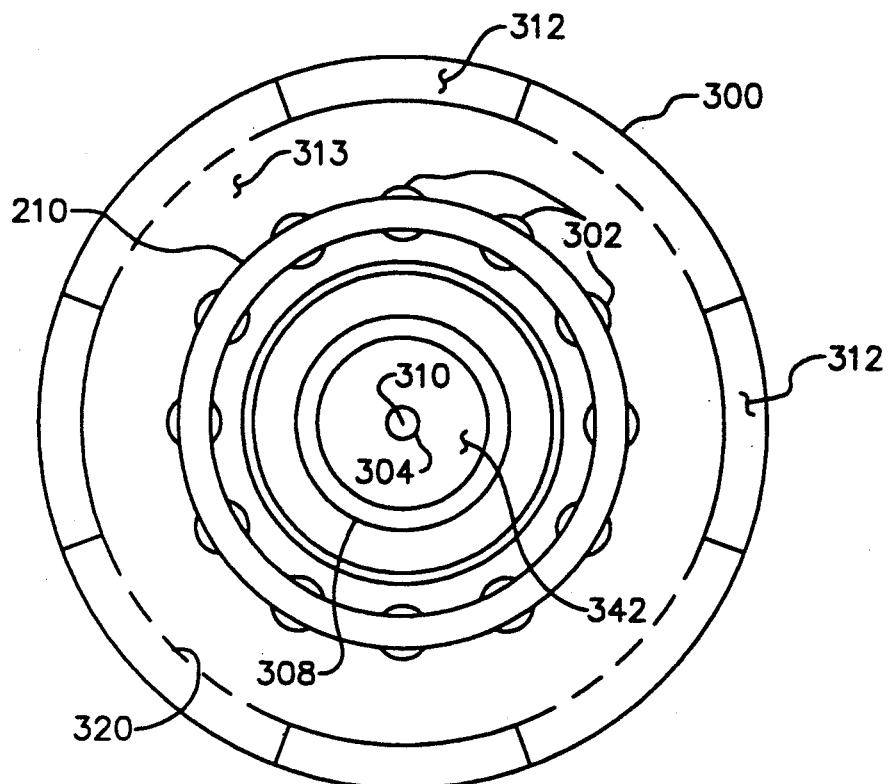
FIG. 3 is a plan view of one embodiment of a support means in accordance with the present invention.
Figure 4:
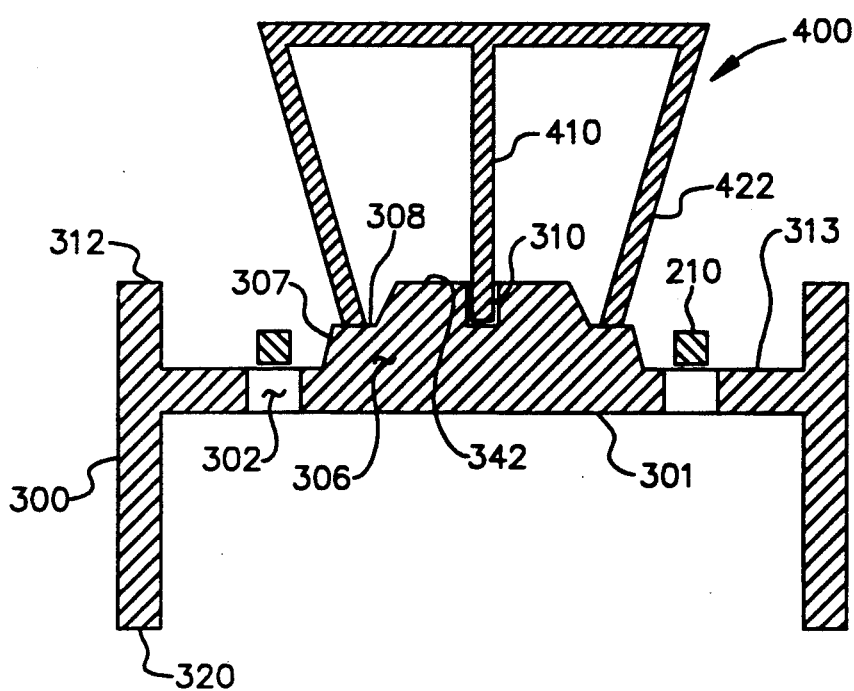
FIG. 4 is a cross-sectional view of a support means and motion limiting means in accordance with the present invention.

Illustrated in FIGS. 3 and 4 is a support means 300 which serves to support the preform 210 during cleaning operations as will be more fully described. Support means 300 includes a plate like member 301 having a plurality of apertures 302 generally spaced approximately 30 degrees apart relative to central axis 304 such that the plurality of apertures 302 lie on the circumference of a ring shape having a diameter substantially the same as preform 210. Support means 300 includes a hub like protrusion 306 extending from planar surface 313 of plate member 301. Protrusion includes a planar surface forming a ring shaped ledge 308 for supporting a motion limiting means 400 whose cross-section is particularly illustrated in FIG. 4. Protrusion 306 also includes a bore 310 for receiving a pin member 410 of motion limiting means 400 Support means 300 also includes four alignment members 312 evenly distributed about the circular periphery of support means 300, and extending away from plate member 301 in the same direction as protrusion 306.

A ring shaped indium preform 210 placed on support means 300 is also illustrated in FIGS. 3 and 4. Preform 210 is illustrated as being substantially aligned with the ring shaped pattern of the plurality of apertures 302. Further, the height of the ledge 308 of protrusion 306 is intended to be somewhat higher than the thickness of preform 210, e.g. 0.020 inches. In the embodiment of the invention illustrated in FIGS. 3 and 4, the protrusion 306 includes a tapered wall 307 which has a diameter smaller at the periphery of ledge 308 than at its interface with plate member 301. This configuration of protrusion 306 serves as a guide for centrally placing preform 210 on support means 300. With the proper design of protrusion 306, preform 210 may be placed on the plate member 301 such that the apertures 302 lie just under the preform. Of course, the size of the apertures 302 are intended to be in proportion to the size of the preform so that fluid flowing through the apertures can surround at least portions of preform 210.

One example of a preform 210 is one in which the outer and inner diameters are approximately 0.540 and 0.500 inches, respectively, and the thickness of the washer-like preform is 0.020 inches.

Figure 5:
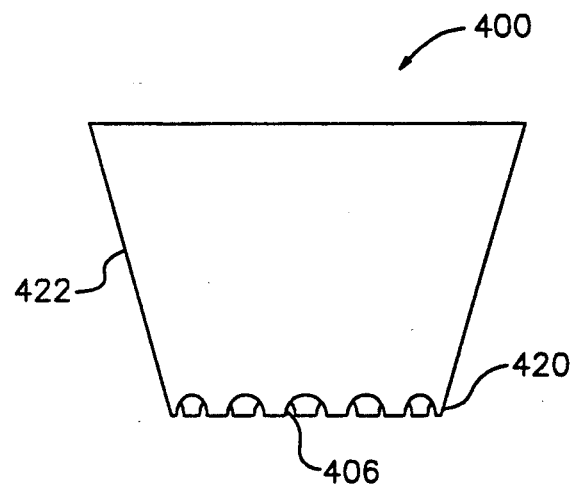
FIG. 5 is a plan view of a motion limiting means in accordance with the present invention.

Referring now more particularly to FIGS. 4 and 5, motion limiting means 400 is somewhat cupped shape having a tapered exterior wall 422 such that the outside diameter of the rim 420 is less than the inside diameter of the ring shaped preform 210, and is tapered away from the rim such that portions of the tapered exterior wall 422 exceed the inside diameter of the ring shaped preform 210.

Pin member 410 of motion limiting means is intended to snugly fit into bore 310 when the rim 420 seats against the ledge 308 of the support means 300, and thereby securely couples the motion limiting means 400 to the support means 300. As noted in FIG. 4, support means 300 includes a further hub like protrusion 342 for enhancing the friction fit between motion coupling member 400 and support means 300.

FIG. 5 illustrates a plan view of motion limiting means 400. More particularly, FIG. 5 shows that the rim 420 has a somewhat serrated edge 406 so as to permit fluid flow into the chamber formed by the cup-shape of motion limiting means 400 when the rim 420 is seated on the ledge 308 as will be subsequently described.

Figure 6A:
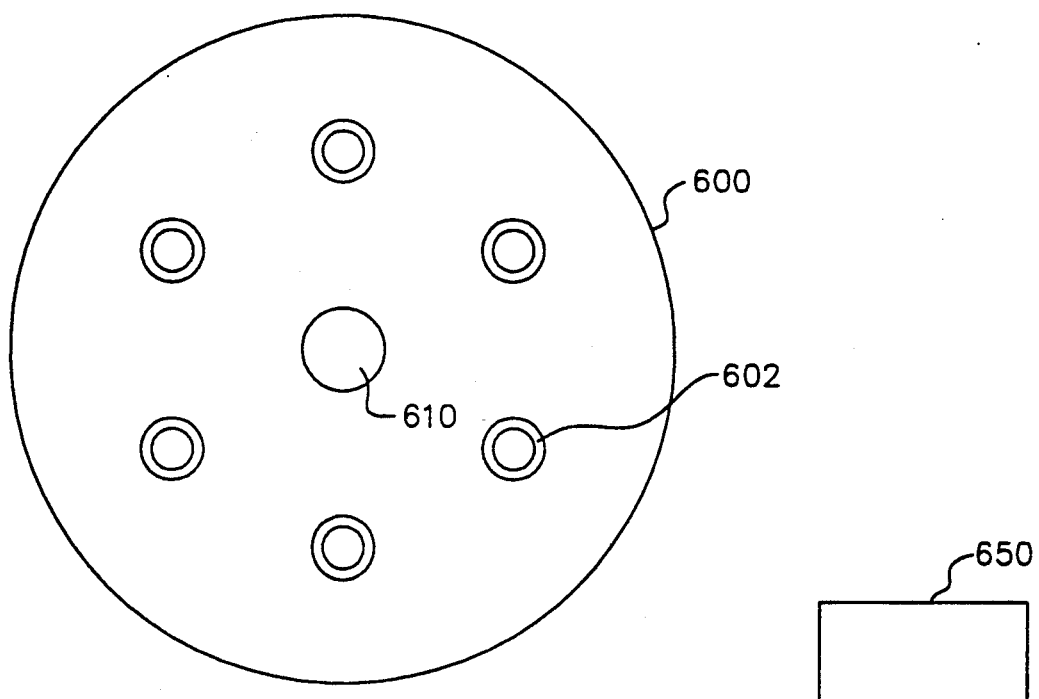
FIG. 6a is a plan view of a receptacle means for holding a plurality of support means.
Figure 6B:
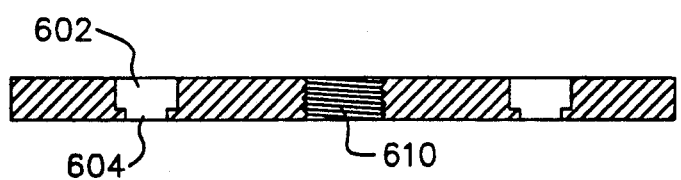
Figure 6C:
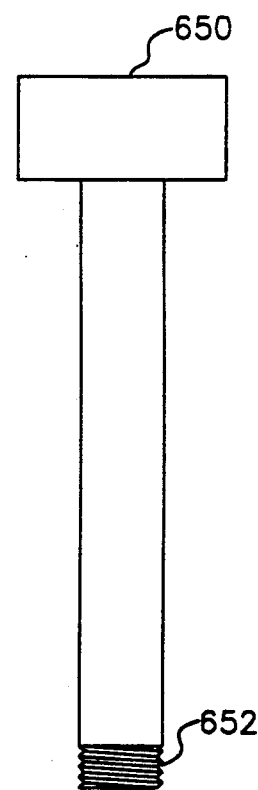

FIGS. 6A and 6B show a plan view and a cross-section view, respectively, of a receptacle means 600 including a plate member 606 for holding a plurality of support means 300, respectively. The receptacle means plate member 606 includes a plurality of bores 604 completely through plate member 606. Aligned with each bore 604 is a counterbore 602 having a diameter greater than the diameter of bore 604. The counterbore diameter is intended to be sufficient to receive the cylindrically shaped protrusion member 320 of support means 300, and form a snug fit. Lastly, receptacle means 600 includes a threaded aperture 610 for receiving a handle means 650 which includes threaded shaft 652 for being screwed into threaded aperture 610.

As discussed earlier, in joining together two articles using an indium seal, particularly for laser applications, the articles to be joined together must have their mounting surfaces very clean. This may be accomplished by a wide variety of techniques including polishing, plasma cleaning, detergent solution cleaning, acid cleaning, and the like for making the mounting surfaces essentially pure from any particulate or other contamination. The parts may also be baked in order to dry any remaining solvents on the articles, as well as to accelerate outgassing of the parts or materials. Also, as is taught in the prior art, the indium seal is also required to be super-clean to avoid, again, any contamination of the lasing gas of the laser devices.

U.S. Pat. No. 4,153,317, issued to Ljung et al, entitled "Indium Seal For Gas Laser", used an indium solder, and the indium was applied with a soldering iron. Therefore, the molten indium was essentially in its pure raw state. Cleaning was not described in the Ljung et al patent, and it is assumed that the use of molten indium was substantially pure, and by virtue of the heat, accelerated outgassing of impurities, and eliminated any oxides if the joint was made quickly thereafter. In contrast, in the aforesaid U.S. Pat. No. 4,273,282, the indium seal already applied to one of the articles was super-cleaned by putting it in a bell jar at low pressure and irradiating the surface with electrical plasma, ions, or ultraviolet light. The aforesaid McNaught et al patent did not require cleaning of the indium since the indium preform was produced immediately before the articles to be joined together so that presumably there was no surface oxide film created on the indium preform and the indium remained essentially pure.

In the present invention, an indium preform may be utilized for the joining of two articles together in such a manner which is advantageous for low cost production; and, at the same time, provide a highly pure indium preform without directly handling the preform so that any and all potential contamination of the preform is minimized.

Referring now to the drawings, the method of utilizing an indium preform in accordance with the present invention will now be described. The ring shaped indium preform 210 is placed on support means 300 directly over the flow through apertures 302 assisted by the alignment aiding protrusion member 306. In turn, the motion limiting means 400 is coupled to the support means 300 by virtue of a snug fit of pin member 410 into aperture 310 of protrusion 306. Because of the tapered exterior wall 422, preform 210 may only have freedom of movement in a direction bounded by plate member 301 and motion limiting means 400. Essentially, the indium preform can freely float about, its movement being only restricted by the combination of protrusion member 306 and the exterior wall 422. Because of the tapered exterior wall 422 of motion limiting means 400, the motion of the preform 210 in a direction perpendicular to the planar surface 313 of support means 300 and motion in a horizontal direction relative to the planar surface 313 of support means 300 is limited. With the combination of the support means 300 and motion limiting means 400, the preform 210 is permitted to freely move within the aforesaid boundaries without any forces applied to the preform, and thereby the preform 210 substantially retains its shape by virtue of free, though limited available movement.

In order to clean or deoxidize preform 210, the combination of support means 300, motion limiting means 400, and preform 210 may first be inserted into aperture 602 of receptacle means 600. The diameter of apertures 602 are such that protrusion 320 of support means 300 snugly fits therein. In turn, handle means 650 may be threaded into the receptacle means, so that the entire assembly of the receptacle means 600 with a plurality of preforms 210, secured by the support means 300 and the motion limiting means 400, may be inserted into a selected one or more cleaning agents or solutions of choice without directly handling the preform 210. When the assembly as aforesaid is inserted into a liquid solution, fluid may flow through bore 604 of receptacle means 600 and through apertures 302 to allow cleaning of the preform 210. Further, the serrated edge 406 of motion limiting means 400 permits turbulent fluid action to flow through the motion limiting means 400, thereby allowing fluid motion across the surface 313 of plate member 301. Therefore, the entire assembly including receptacle means 600 and the combination of preform 210 along with support means 300 and motion limiting means 400 may be agitated as a unit through handle means 650 by a variety of techniques in any one or more chosen cleaning or deoxidizing solutions; and the placement of the preform 210 on support means 300 as described permits turbulent fluid action to enhance cleaning or deoxidizing of the indium preform 210.

After the cleaning or deoxidizing operation, the entire assembly as aforesaid may be thoroughly dried by a variety of techniques, such as air or pure gas drying techniques. Of course, such techniques require very pure gases to, again, avoid any contamination of the indium.

It should be noted, that the aforesaid assembly may be left in a non-corrosive solution to maintain the purity of the preforms just prior to use for joining two articles together. Therefore, only drying the preform prior to use would be required, preferably by a non-oxidizing gas.

After the drying process has been completed, the combination of the support means 300 and the motion limiting means 400 may be removed from the receptacle means 600, and in turn the motion limiting means 400 may then be removed. For articles, like cathode 22, having a substantially annular mounting surface, alignment members 312 allow the insertion of the article to be placed in juxtaposition with, centered and aligned with the preform. Further, the mounting surface may then be sufficiently pressed against the preform such that the indium preform sticks to the mounting surface. In turn, the article may then be removed from the support means 300 with the indium preform 210 intact so that it may subsequently be pressed against another article's mounting surface with sufficient pressure to seal together the second article to the first article.

Therefore, in the processes just described, an indium preform 210 is utilized to join together two articles in a manner such that the indium preform 210 is only handled once before the cleaning process and the joining process are undertaken. More specifically, the only time the indium preform 210 is handled is in its placement onto the support means 300 over the flow through apertures 302. Afterwards, the preform 210 is cleaned, and then applied to one of the article's mounting surfaces without ever directly handling the preform. Afterwards, the one article with the indium preform may then be applied to the article which is intended to be joined thereto. The process as just described particularly lends itself to gas discharge applications, more specifically laser applications, in which purity of the joint is highly demanded.

All those skilled in the art will recognize that only preferred embodiments of the present invention have been disclosed herein, and that the embodiments may be altered and modified without departing from the true spirit and scope of the invention as defined in the accompanying claims. More specifically, the Figures generally depict an article which has an annular or ring shaped mounting surface which is intended to be joined to another mounting surface utilizing a washer-like preform. It is intended within the scope of the present invention that mounting surfaces other than ring-shaped are within the scope of the present invention, as well as preforms of any shape.

Although the flow through apertures 302 of support means 300 are shown as circular apertures, the flow through apertures may be of any shape, for example rectangular slots, etc, which permits the passage of a fluid during the agitation step of cleaning the assembly.

The motion limiting means 400 has been shown to be a substantially cylindrical member. However, any motion limiting means 400 which permits turbulent fluid flow about the preform, and permits free movement of the preform 210, although restricted relative to the support member is within the scope of the present invention.

Although the preform has been illustrated to be ring or washer shaped, any preform of any shape or material other than indium is within the scope of the present invention.

Lastly, although receptacle means 600 has been shown to handle one or more combinations of support means 300 and motion limiting means 400, the aforesaid combination may be handle directly without the use of the receptacle means 600 for cleaning or deoxidizing preform 210 contained therewith.

The embodiment of the invention in which an exclusive property or privilege are claimed are defined as follows:

1. A method of sealing a mounting surface of a first article to a mounting surface of a second article, the method comprising:
   placing a preform seal of a selected shape and material on a support means having a plurality of flow through apertures passing through a plate member thereof such that said apertures are located to be in alignment with and under at least portions of said preform to permit the passage of a fluid through said apertures and around at least selected portions of said preform;
   coupling a motion limiting means to said support means, the combination of said support means and said motion limiting means serving to limit the freedom of motion of said preform relative to said plate member;
   subjecting the combination of said support means, said motion limiting means, and said preform as a unit to a selected one or more cleaning or deoxidizing agents by handling the combination of said plate member and said motion limiting means without handling said preform and allowing said preform to have freedom of movement bounded by said plate member and said motion limiting means;
   decoupling and removing said motion limiting means from said support means;
   placing said first article mounting surface in juxtaposition with and centrally aligned with said preform, and sufficiently pressing said first article against said preform such that said preform sticks to said first article mounting surface;
   removing said combination of said preform and said first article away from said plate member; and
   pressing said first article mounting surface with said preform against said second article mounting surface with sufficient pressure to seal together said mounting surfaces of said first and second articles.

2. The method of claim 1 wherein said preform consists essentially of indium.

3. A method of sealing an electrode to a gas discharge cavity including a block having a bore surrounded by a mounting surface, the method comprising:
   placing a preform seal of a selected shape, consisting substantially of indium, on a support means having a plurality of flow through apertures passing through a plate member thereof such that said apertures are located to be in alignment with and under at least portions of said preform to permit the passage of a fluid through said apertures and around at least selected portions of said preform;
   coupling a motion limiting means to said support means, the combination of said support means and said motion limiting means serving to limit freedom of motion of said preform relative to said plate member;
   subjecting the combination of said support means, said motion limiting means, and said preform as a unit to a selected one or more cleaning and deoxidizing agents by handling the combination of said plate member and said motion limiting means without handling said preform and allowing said preform to have freedom of movement bounded by said plate member and said motion limiting means;
   decoupling and removing said motion limiting means from said support means;
   placing said electrode mounting surface in juxtaposition with and centrally aligned with said preform, and sufficiently pressing said first electrode against said preform such that said indium preform sticks to said electrode mounting surface;
   removing said combination of said preform and said electrode away from said plate member; and
   pressing said electrode mounting surface with said indium against said mounting surface surrounding said bore with sufficient pressure to seal together said electrode to said block.

* * * * *